United States Patent
Lee et al.

(10) Patent No.: US 10,189,964 B2
(45) Date of Patent: Jan. 29, 2019

(54) METHODS FOR PREPARING OPEN-CELLED POLYURETHANE FOAMS, SYSTEMS FOR USE THEREIN, AND OPEN-CELLED POLYURETHANE FOAMS PRODUCED THEREBY

(71) Applicant: Bayer MaterialScience LLC, Pittsburgh, PA (US)

(72) Inventors: Bin Lee, Moon Township, PA (US); Paul O. Barley, Burgettstown, PA (US)

(73) Assignee: COVESTRO LLC, Pittsburgh, PA (US)

( * ) Notice: Subject to any disclaimer, the term of this patent is extended or adjusted under 35 U.S.C. 154(b) by 295 days.

(21) Appl. No.: 14/733,116

(22) Filed: Jun. 8, 2015

(65) Prior Publication Data
US 2016/0355658 A1   Dec. 8, 2016

(51) Int. Cl.

| | |
|---|---|
| C08J 9/00 | (2006.01) |
| C08G 18/48 | (2006.01) |
| C08G 18/76 | (2006.01) |
| C08G 101/00 | (2006.01) |
| B29K 105/00 | (2006.01) |
| B29K 105/04 | (2006.01) |
| B29K 75/00 | (2006.01) |
| B29C 44/02 | (2006.01) |
| B29C 44/34 | (2006.01) |
| B29C 44/40 | (2006.01) |
| B29C 44/58 | (2006.01) |
| B29K 105/24 | (2006.01) |

(52) U.S. Cl.
CPC ........ *C08J 9/0066* (2013.01); *C08G 18/4812* (2013.01); *C08G 18/4816* (2013.01); *C08G 18/4825* (2013.01); *C08G 18/4841* (2013.01); *C08G 18/7664* (2013.01); *C08G 18/7671* (2013.01); *C08J 9/0042* (2013.01); *B29C 44/02* (2013.01); *B29C 44/3415* (2013.01); *B29C 44/40* (2013.01); *B29C 44/588* (2013.01); *B29K 2075/00* (2013.01); *B29K 2105/0014* (2013.01); *B29K 2105/045* (2013.01); *B29K 2105/24* (2013.01); *B29K 2911/12* (2013.01); *B29K 2995/0063* (2013.01); *B29K 2995/0088* (2013.01); *C08G 2101/0008* (2013.01); *C08G 2101/0016* (2013.01); *C08J 2375/08* (2013.01)

(58) Field of Classification Search
CPC ............ B29C 44/3411; C08G 18/4812; C08G 18/4816; C08G 18/4825; C08G 18/4841; C08G 18/7664; C08G 18/7671; C08G 2101/0008; C08G 2101/0016; C08J 9/0042; C08J 9/0066; C08J 2375/08
See application file for complete search history.

(56) References Cited

U.S. PATENT DOCUMENTS

| | | |
|---|---|---|
| 3,086,248 A | 4/1963 | Culp |
| 3,124,627 A | 3/1964 | Hood |
| 3,129,270 A | 4/1964 | Hood |
| 3,607,797 A | 9/1971 | Rubens et al. |
| 3,890,414 A | 6/1975 | Ricciardi et al. |
| 4,200,603 A | 4/1980 | Raffel et al. |
| 4,246,214 A | 1/1981 | Osswald et al. |
| 5,350,554 A | 9/1994 | Miller |
| 5,409,649 A | 4/1995 | Pool |
| 6,211,257 B1 | 4/2001 | Kaplan et al. |
| 6,234,777 B1 | 5/2001 | Sperry et al. |
| 7,101,163 B2 | 9/2006 | Sulzbach et al. |
| 2004/0146704 A1 | 7/2004 | Zolfaghari |
| 2004/0212125 A1 | 10/2004 | Meyer-Ahrens et al. |
| 2008/0227879 A1 | 9/2008 | Lee et al. |
| 2010/0087561 A1 | 4/2010 | Abraham et al. |
| 2010/0151227 A1* | 6/2010 | Donatti ................ B29C 44/08 428/319.3 |
| 2012/0178839 A1* | 7/2012 | Burdeniuc ............ C08G 18/16 521/121 |
| 2013/0203880 A1 | 8/2013 | George et al. |

* cited by examiner

*Primary Examiner* — John M Cooney
(74) *Attorney, Agent, or Firm* — Donald R. Palladino

(57) ABSTRACT

Disclosed are methods and systems for preparing open-celled polyurethane foams by a discontinuous box foam process in which (a) a polyurethane foam-forming composition is deposited into a container having a gas-permeable base and (b) the polyurethane-foam forming composition is allowed to form an open-celled polyurethane foam in the container. In these methods and systems, the gas-permeable base is heated before, during, and/or after step (a) and heating is continued during at least a portion of step (b).

18 Claims, 1 Drawing Sheet

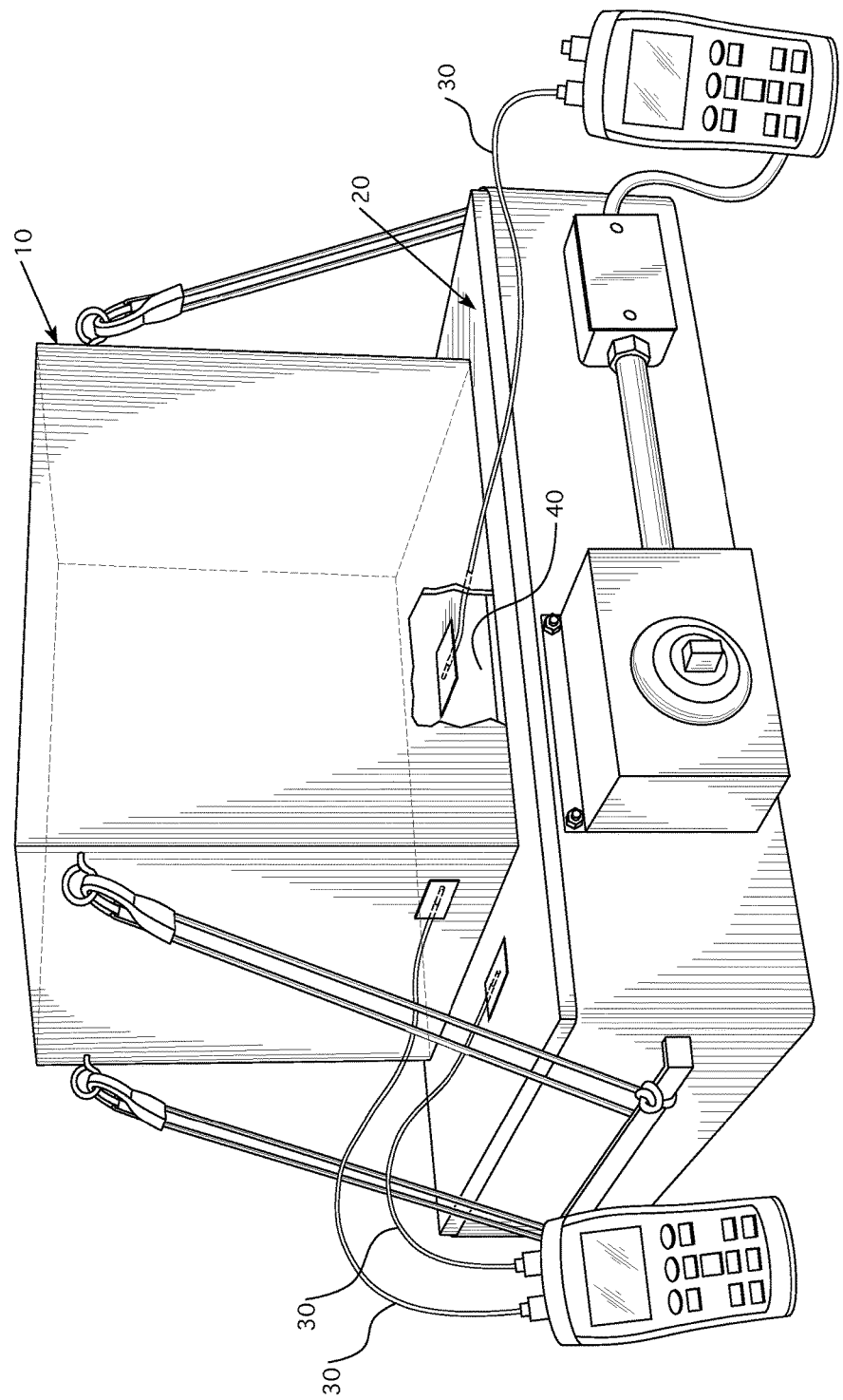

METHODS FOR PREPARING OPEN-CELLED POLYURETHANE FOAMS, SYSTEMS FOR USE THEREIN, AND OPEN-CELLED POLYURETHANE FOAMS PRODUCED THEREBY

FIELD

The present invention is directed to, among other things, methods and systems for preparing open-celled polyurethane foams by a discontinuous box foam process in which a polyurethane foam-forming composition is deposited into a container and allowed to rise in the container to form an open-celled polyurethane foam.

BACKGROUND

Discontinuous box foam processes are used to produce water-blown open-celled polyurethane foams used in many applications, such as, for example, automotive hoodliners, headliners and sun shades. In this process, a water-blown polyurethane foam-forming composition is deposited, often by pouring, into a large box and allowed to rise and form an open-celled polyurethane foam, often referred to as a "bun", in the box. The exothermic polyurethane foam-forming reaction generates heat. After the foam sets, a degas process takes place by sudden evaporation of a mixture of steam and $CO_2$, leaving a number of small craters on the surface of the slab. This blow-out process is the outward sign that the foam cells have opened. After an additional 30 minutes or so, the bun is then typically removed from the box and allowed to cool at ambient conditions for roughly 24 to 48 hours. Once the foam bun has cooled, it is sliced to sheets of the desired thickness for the end product, such as an automotive hoodliner, headliner, and/or sun shades. Prior to such slicing, however, the sides and top and bottom of the bun are typically trimmed to square off the bun. This trimmed foam is generally waste.

One area of difficulty in such discontinuous box foam processes to produce water-blown open-celled polyurethane foams is the degree of waste generated at the bottom of the bun. Water reacts with the polyisocyanate in the composition during foam formation, which produces carbon dioxide. This carbon dioxide can generally escape from the upper portions of the open-celled polyurethane foam bun, but more often becomes trapped in the bottom portion which creates large voids in the bottom portion of the bun following the degas process, resulting in a foam having a poor appearance and significantly lower density at the bottom of the bun relative to other portions of the bun. The portion of the bottom of the bun containing these large voids is waste.

Attempts have been made to minimize the waste produced from the bottom of the bun in such processes. For example, chemical modifications of the polyurethane foam-forming composition, such as manipulation of surfactant and/or catalyst in the composition, have been attempted to increase cell tightness. A problem with these compositional approaches, however, is that increasing cell tightness throughout the entire bun can have a detrimental effect on physical properties of the resulting foam and also can detrimentally effect properties, such as acoustic properties, of the article, such as automotive hoodliner, headliner and/or sun shade, produced from the foam.

As a result, it would be desirable to provide an improved discontinuous box polyurethane foam process that reduces the amount of waste at the bottom portion of the polyurethane bun without making chemical modifications of the polyurethane foam-forming that could have a detrimental impact on the physical properties of the resulting open-celled polyurethane foam bun or articles produced from such a foam.

SUMMARY OF THE INVENTION

In certain respects, the present invention is directed to methods for preparing open-celled polyurethane foams. These methods comprise: (a) depositing a polyurethane foam-forming composition into a container having a gas-permeable base; and (b) allowing the polyurethane-foam forming composition to form an open-celled polyurethane foam in the container. In these methods, the gas-permeable base is heated before, during, and/or after step (a) and heating is continued during at least a portion of step (b), and the method is discontinuous.

In some respects, the present invention is directed to systems for preparing open-celled polyurethane foams using the methods described herein. These systems comprise: (a) a source of a polyurethane foam-forming composition; (b) a container having a gas-permeable base; and (c) a heating device for the gas-permeable base of the container.

The present invention is also directed to, among other things, open-celled polyurethane foams produced by such methods and/or using such systems.

BRIEF DESCRIPTION OF THE DRAWINGS

FIG. 1 is a schematic illustration of the container and heating device used to make open-celled foams in some of the Examples.

DETAILED DESCRIPTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. §132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As indicated, certain embodiments of the present invention are directed to methods for preparing open-celled polyurethane foams. The methods of the present invention are discontinuous. As used herein, the term "discontinuous" is synonymous with batch and refers to a method in which the container takes in all of the reactants of the polyurethane foam-forming composition and then an open-celled foam is formed in the container, and, during the period of this process, no reactants are fed into or removed from the container. The discontinuous methods of the present invention are not a continuous method of foam production, in which a reaction mixture is applied to a moving film disposed on a conveyor belt and allowed to foam on the film.

As used herein, the term "open-celled polyurethane foam" refers to a polyurethane foam having an open-celled content of at least 60% by volume, such as at least 75% by volume, such as 60 to 99% or 75 to 99% by volume, measured according to ASTM D6226—Open Cell Content by Pycnometer. In certain embodiments, the open-celled polyurethane foams produced according to the present invention have a density of at least 10 kg/m$^3$, such as at least 15 kg/m$^3$, or, in some cases, at least 20 kg/m$^3$ and/or up to 50 kg/m$^3$, such as up to 45 kg/m$^3$ or, in some cases, up to 35 kg/m$^3$.

The methods of the present invention comprise depositing a polyurethane foam-forming composition into a container having a gas-permeable base. As used herein, "container" refers to a receptacle for holding the polyurethane foam-forming composition during the foaming process. The containers used in the present invention may, in certain embodiments, be in the form of a box, which, as used herein, refers to a container, often in the form of a square or rectangle, that is formed by a base, such as a tray, and a plurality of side walls, such as at least 3 or at least 4 side walls, and which may or may not have a cover or lid. As indicated, in the present invention, the base of the container is gas-permeable, which means that the base, such as a tray, is disposed such that gas, such as air, can pass through the base to some extent and is constructed of a material through which gas, such as air, can pass to some extent, examples of which include, but are not limited to, paper or cardboard, or a gas-permeable plastic film, such as a polymeric film, containing pinholes to make the film gas-permeable. The use of a gas-permeable base is a critical feature of the present invention, since it is necessary that at least some gas in the bottom of the bun has a means of escaping during the degas process used to produce the open-celled polyurethane foams formed by the methods of the present invention. The base, in certain embodiments of the present invention, therefore, is not, for example, a plastic film. In certain embodiments, the container may be raised above a sub-surface, such as a floor, in order to allow gas to flow through the base, such as where the container is disposed on rails.

In certain embodiments, the polyurethane foam-forming composition is deposited into the container by pouring, though other methods of depositing the composition into the container can be used if desired.

The polyurethane foam-forming compositions used in the present invention comprise a polyol component and a polyisocyanate component. More specifically, in certain embodiments of the methods of the present invention, open-celled polyurethane foams are obtained by reacting a polyisocyanate component with a polyol component which comprises: (a) a polyether polyol having a functionality of from 2 to 6 and a number average molecular weight of more than 160 to 6500, such as where at least 60% by weight, at least 80% by weight or, in some cases, at least 90% by weight, based on total weight of polyol in the polyol component, is one or more such polyether polyol(s), (ii) a chain extending agent and/or crosslinking agent containing at least two isocyanate-reactive groups and having a molecular weight of from 60 to 160, (iii) water, and (iv) a catalyst for polyurethane formation.

The polyisocyanate component used in the methods of the present invention may comprise one or more polyisocyanates, but, in certain embodiments, comprises diphenyl methane diisocyanate (mMDI), polyphenyl polymethylene polyisocyanate (pMDI) or a mixture of one or more diphenyl methane diisocyanates and one or more polyphenyl polymethylene polyisocyanates. In certain embodiments, mixtures of a diphenyl methane diisocyanate and a polyphenyl polymethylene polyisocyanate in which from 10 to 50% by weight of the total polyisocyanate is a diphenyl methane diisocyanate and from 50 to 90% of the total polyisocyanate is a polyphenyl polymethylene polyisocyanate, is used. In certain embodiments, 40 to 80% by weight, such as 45 to 75% by weight, of the total monomeric diphenyl methane diisocyanate isomers include 4,4'-, 2,2'- and/or 2,4'-diphenyl methane diisocyanate.

As indicated, in certain embodiments, the polyol component comprises a polyether polyol having a functionality of from 2 to 6. In certain embodiments, the polyol component includes at least 60% by weight of a polyether polyol, such as at least 80% by weight, or, in some cases, at least 90% by weight, of a difunctional, trifunctional or mixture of di- and tri-functional hydroxyl polyethers having an OH number of from 26 to 1050 (these OH numbers correspond to a number average molecular weight of from more than 160 to 6,500 determined by the end group analysis method).

In certain embodiments, the polyol component also comprises up to 40% by weight, such as up to 25% by weight, or, in some cases, up to 10% by weight, based on total weight of polyol, of other types of polymeric polyols such as polyester polyols and polymer filled polyols.

Examples of difunctional hydroxyl polyethers having an OH number of from 26 to 1050 which may be used in the polyol component used in the methods of the present invention include the difunctional polyethers obtained by reaction of ethylene oxide and/or propylene oxide with glycols such as ethylene glycol, diethylene glycol, 1,2- or 1,3-propylene glycol, butane-1,4-diol, etc. Polypropylene oxides and/or polyethylene oxides having an OH number in this range, in some cases in the range of from 147 to 560 (corresponding to a number average molecular weight of from 200 to 763 as determined by the end group analysis technique) are examples of suitable difunctional hydroxyl polyethers. These short chained polyethers are, in certain embodiments, used in an amount of from 15 to 35% by weight, based on the total weight of the polyol component.

Trifunctional hydroxyl polyethers which may be employed in the polyol component include the trifunctional polyethers obtainable by reaction of ethylene oxide or propylene oxide with trihydric alcohols, such as glycerol, trimethylol propane, monoethanolamine, triethanolamine, sucrose/propylene, glycol/water, etc. These polyethers often have an OH value of 26 to 1050 which corresponds to a number average molecular weight of from more than 160 to 6,500 as determined by the end group analysis method.

In certain embodiments, the polyol component comprises a mixture of difunctional and trifunctional hydroxyl polyethers. In certain embodiments, the polyol component comprises (i) 20 to 40% by weight, based on the total weight of the polyol component, of a polypropylene oxide-based polyether diol, such as a glycerin-initiated polyether diol, having an OH number in the range of from 450 to 600, (ii) 30 to 50% by weight, based on the total weight of the polyol component of a poly(propylene/ethylene oxide) glycerin-initiated polyether triol having an OH number in the range of from 26 to 34; and (iii) 10 to 30% by weight, based on the total weight of the polyol component, of a polypropylene oxide-based polyether triol, such as a glycerin-initiated polyether triol, having an OH number in the range of from 400 to 550, such as 445 to 495. Suitable polyethers polyols also include filler-containing polyethers which contain approximately 20% by weight of a solid styrene/acrylonitrile copolymer grafted on or approximately 20% by weight of a solid reaction product of toluene diisocyanate (TDI) and hydrazine in dispersed form.

As indicated, the polyol component included in the polyurethane foam-forming compositions used in the methods of the present invention comprises a chain extending agent and/or crosslinking agent containing at least two isocyanate-reactive groups and having a molecular weight of from 60 to 160, specific examples of which include, but are not limited to, glycerol, butanediol, ethylene glycol, diethylene glycol, propylene glycol, ethylenediamine, ethanolamine, triethanolamine, trimethylolpropane and pentaerythritol, including mixtures of two or more thereof.

In certain embodiments, such a chain extending agent and/or crosslinking agent is present in an amount of at least 1% by weight, such as at least 5% by weight and/or up to 20% by weight or, in some cases, up to 10% by weight, based on the total weight of the polyol component.

In the methods of the present invention, the blowing agent used in the polyurethane foam-forming composition comprises water. In addition to water, other blowing agents may also be used, such as, for example, hydrocarbons, hydrofluorocarbons, including, but not limited to, $C_3$ and $C_4$ polyfluoroalkanes and polyfluoroalkenes (including, but not limited to, any isomers of 1-chloro-3,3,3-trifluoropropene and 2-chloro-3,3,3-trifluoropropene), including hydrochlorofluorocarbons. In certain embodiments, water is included in an amount of 1 to 9% by weight, such as 2.5 to 7% by weight, or, in some cases, 3 to 6% by weight, based on total weight of the polyol component. If any other blowing agents are included, such other blowing agent are often not be employed in an amount greater than 2% by weight. In certain embodiments, water is the sole blowing agent used in the polyurethane foam-forming composition.

In certain embodiments, the polyol component also comprises a foam stabilizer and/or a cell opener, such as where the polyol component comprises 0.01 to 2% by weight, such as 0.1 to 0.7% by weight, of a foam stabilizer and/or cell opener based on the total weight of the polyol component. Any foam stabilizer and/or cell opener is suitable, such as, for example, silicone foam stabilizers, such as those having a relatively short polyether group and a relatively long silicone group.

In certain embodiments of the methods of the present invention, the polyol component comprises a catalyst for polyurethane formation, such as a modified amine catalyst, such as where the modified amine catalyst is included in an amount of from 0.5 to 8% by weight, such as 1 to 5% by weight, or, in some cases, 2 to 4% by weight, based on total weight of the polyol component.

In certain embodiments of the present invention, the modified amine catalyst comprises the reaction product of (1) an amine, such as an amine having at least two amino groups, with at least one of those amino groups being a tertiary amino group with (2) an oil, such as a bio-based oil or a derivative thereof having a molecular weight of 500 to 800. In certain embodiments, the modified amine catalyst comprises a reaction product of (1) amines such as those represented by the formula $R_2—N—R'_x—NH_2$ where R and R' each represents a hydrocarbon and x represents an integer, such as N,N-dimethyl-propylene diamine with (2) an oil, such as castor oil or any fatty acid, such as tall oil. In certain embodiments, the modified amine catalyst is a reaction product of N,N-dimethyl-propylene diamine with tall oil.

In addition to or, in some cases, in lieu of, the aforedescribed modified amine catalyst, the polyol component may comprise other known catalyst(s) for polyurethane formation.

Other known auxiliaries and additives may also be used in the production of foams in accordance with the process of the present invention. Examples of such optional additives include, for example, surface-active additives, such as emulsifiers; cell regulators, such as paraffins, fatty alcohols and dimethyl polysiloxanes; pigments or dyes; flameproofing agents such as trischloroethyl phosphate and tricresyl phosphate; stabilizers against the effects of ageing and weathering; plasticizers; fungistatic and bacteriostatic agents; and fillers, such as barium sulfate.

In certain embodiments of the present invention, the polyol component is mixed with the polyisocyanate component in a ratio by weight of polyol to isocyanate of from 100:150 to 100:200. This mixing is often carried out in a low-pressure or a bucket type foaming machine. In certain embodiments, the polyol component and the polyisocyanate component are mixed in a ratio such that the NCO/OH index is 75 to 130, such as 85 to 125 or, in some cases, 100 to 120.

In the methods of the present invention, the polyurethane-foam forming composition is allowed to form an open-celled polyurethane foam in the container. In certain embodiments, the foamable mixture is activated so that the foaming reaction begins in 30 to 60 seconds, as measured from the emergence of the first amount of the foam-forming composition from a mixing head (referred to as "cream time"). In certain embodiments, after 150 to 200 seconds, as measured from the emergence of the first amount of the foam-forming composition from the mixing head, the foam gels (referred to as "gel time") and, after 3 to 5 minutes, as measured from the emergence of the first amount of the foam-forming composition from the mixing head, the degas process occurs, i.e. the sudden evaporation of a mixture of steam and $CO_2$, leaving a number of small craters on the surface of the slab. This blow-out process is the outward sign that the foam cells have opened, thereby forming an open-celled polyurethane foam.

It is a critical feature of the present invention that the gas-permeable base of the container is heated before, during, and/or after step (a) and heating is continued during at least a portion of step (b). In certain embodiments, the heating is continued during all of step (b).

In certain embodiments, the heating of the gas-permeable base is accomplished by a heating device, such as a heating pad, matt or plate disposed beneath the gas-permeable base, though other devices for heating the base can be envisioned, such as, for example, heating the gas-permeable base in an oven or under an infrared lamp or other device prior to inclusion of the base as part of the container. In certain embodiments, the heating device is a pad, matt or plate that is dimensioned to have a length at least as long as the length of the base of the container and a width at least as wide as the width of the base of the container. In certain embodiments of the present invention, the base is heated to a temperature of at least 25° C., such as at least 30° C., at least 35° C. or at least 40° C. and, in some cases, up to 120° C., such as up to 90° C., such as up to 70° C. or up to 65° C. or up to 60° C. Moreover, in certain embodiments, the base is heated to a temperature of at least 10° C., such as at least 15° C. or, in some cases, at least 20° C. higher and, in some cases, no more than 50° C., such as up to 30° C. higher than the temperature of the ambient air in which the container is disposed. As a result, in certain embodiments, the base is heated to a temperature of at least 10° C., such as at least 15° C. or, in some cases, at least 20° C. higher and, in some cases, no more than 50° C., such as up to 30° C. higher than the temperature of the other portions of the container, including the side walls of the container and/or the cover or lid (if any). As indicated, in certain embodiments, such a temperature is continued during the entirety of step (b) of the methods of the present invention. In some embodiments of the present invention, such heating is continued, and the temperature of the base is maintained within one or more of the above-recited ranges, during the entire period from the beginning of the emergence of the first amount of the foam-forming composition from a mixing head through the degas process.

It should be appreciated that the methods of the present invention also contemplate the optional heating of only a bottom portion of the side walls of the container, in addition to the base, provided, however, that, in certain embodiments, the entire surface of the side walls is not heated at least to the same extent as the base. For example, in certain embodiments, up to 10% of the length of the side walls, proximate to the base, may also be heated in the same manner or a different manner as the base. In certain embodiments of the present invention, only the gas-permeable base of the container is heated as described above.

In certain embodiments, the foams produced by the methods of the present invention are used for the production of automobile hoodliners, headliners and/or sun shades. The foams can have a glass transition temperature of about 150° C. and, hence, high heat resistance and can have almost no resilience, so that edges which are tightly compressed to different extents retain their cross-section. This compression retention ensures an exact fit of the parts required during installation.

It has been discovered, surprisingly, that the discontinuous methods for preparing open-celled polyurethane foams of the present invention can result in the production of an open-celled polyurethane foam bun in which the amount of large voids in the bottom portion of the bun is eliminated or at least significantly reduced relative to the same process in which the gas-permeable base of the container is not heated, thereby eliminating or at least significantly reducing the amount of waste produced from the bottom of the bun, without detrimentally effecting the physical properties of the foam or the acoustic properties of the articles produced using the foam. Without being bound by any theory, it is believed that the foregoing results arise because the methods of the present invention produce a high molecular weight polyurethane at the bottom portion of the bun more quickly than other portions of the bun, thereby producing a foam bun with a higher foam density, and cell tightness, at the bottom portion of the bun relative to other portions of the bun. This higher foam density, it is currently believed, prevents steam and/or $CO_2$ produced during the foam-formation process from opening the foam cells at the bottom of the bun during the degas process described above. As a result, the present invention is also directed to the discontinuous methods for preparing open-celled polyurethane foams of the present invention described above wherein the method produces a foam bun having a higher foam density at one side thereof (the side proximate to the base of the container), such where the higher density portion extends for a length of up to 10% of the total height of the bun, than the density of the remaining portion of the bun.

As will be appreciated from the foregoing description, other embodiments of the present invention are directed to systems for preparing open-celled polyurethane foams. These systems comprise: (a) a source of a polyurethane foam-forming composition, such as the polyurethane foam-forming compositions described above; (b) a container having a gas-permeable base, such as those described above; and (c) a heating device for the gas-permeable base of the container, such as those described above.

As will be appreciated by the foregoing, some embodiments of the present invention are directed to methods for preparing open-celled polyurethane foams by the methods described herein, comprising: (a) depositing a polyurethane foam-forming composition into a container having a gas-permeable base; and (b) allowing the polyurethane-foam forming composition to form an open-celled polyurethane foam in the container, wherein the gas-permeable base is heated before, during, and/or after step (a) and heating is continued during at least a portion of step (b) and wherein the method is discontinuous.

Some embodiments of the present invention are directed to a method of the previous paragraph, wherein the open-celled polyurethane foam has an open-celled content of at least 60% by volume, such as at least 75% by volume, such as 60 to 99% or 75 to 99% by volume, measured according to ASTM D6226—Open Cell Content by Pycnometer.

In certain embodiments, the present invention is directed to a method of either of the previous two paragraphs, wherein the open-celled polyurethane foam has a density of 10 to 50 kg/m$^3$, such as 15 to 45 kg/m$^3$ or 20 kg/m$^3$ to 35 kg/m$^3$.

Certain embodiments of the present invention are directed to a method of any of the previous three paragraphs, wherein the container is in the form of a box, which, in some embodiments, is in the form of a square or rectangle, that is formed by a base, such as a tray, and a plurality of side walls, such as at least 3 or at least 4 side walls, and which may or may not have a cover or lid.

In some embodiments, the present invention is directed to a method of any of the previous four paragraphs, wherein the gas-permeable base is constructed of paper or cardboard and, in some embodiments is not a plastic film and, in some embodiments, is raised above a sub-surface, such as a floor, such as where the container is disposed on rails.

Certain embodiments of the present invention are directed to a method of any of the previous five paragraphs, wherein the polyurethane foam-forming composition is deposited into the container by pouring.

In certain embodiments, the present invention is directed to a method of any of the previous six paragraphs, wherein the open-celled polyurethane foam is obtained by reacting a polyisocyanate component with a polyol component which comprises: (i) a polyether polyol having a functionality of from 2 to 6 and a number average molecular weight of more than 160 to 6500, such as where at least 60% by weight, at least 80% by weight or, in some cases, at least 90% by weight, based on total weight of polyol in the polyol component, is one or more such polyether polyol(s), (ii) a chain extending agent and/or crosslinking agent containing at least two isocyanate-reactive groups and having a molecular weight of from 60 to 160, (iii) water, and (iv) a catalyst for polyurethane formation, such as where the polyisocyanate component comprises a mixture of a diphenyl methane diisocyanate and a polyphenyl polymethylene polyisocyanate in which from 10 to 50% by weight of the total polyisocyanate is a diphenyl methane diisocyanate and from 50 to 90% of the total polyisocyanate is a polyphenyl polymethylene polyisocyanate, is used, such as where 40 to 80% by weight, such as 45 to 60% by weight, of the diphenyl methane diisocyanate is 2,4'-diphenyl methane diisocyanate; and/or wherein the polyol component includes at least 60% by weight of a polyether polyol, such as at least 80% by weight, or, in some cases, at least 90% by weight, of a difunctional, trifunctional or mixture of di- and tri-functional hydroxyl polyethers having an OH number of from 26 to 1050 and/or wherein the polyol component also comprises up to 40% by weight, such as up to 25% by weight, or, in some cases, up to 10% by weight, based on total weight of polyol, of other types of polymeric polyols such as polyester polyols; and/or the polyol component comprises a mixture of difunctional and trifunctional hydroxyl polyethers, such as where the polyol component comprises (i) 20 to 40% by weight, based on the total weight of the polyol component, of a polypropylene oxide-based polyether diol, such as a glycerin-initiated polyether diol, having an OH number in the range of from 450 to 600, (ii) 30 to 50% by weight, based on the total weight of the polyol component of a polypropylene/ethylene oxide) glycerin-initiated polyether triol having an OH number in the range of from 26 to 34; and (iii) 10 to 30% by weight, based on the total weight of the polyol component, of a polypropylene oxide-based polyether triol, such as a glycerin-initiated polyether triol, having an OH number in the range of from 400 to 550, such as 445 to 495; and/or the chain extending agent and/or crosslinking agent contains at least two isocyanate-reactive groups and has a molecular weight of from 60 to 160, such as where such a chain extending agent and/or crosslinking agent is present in an amount of at least 1% by weight, such as at least 5% by weight and/or up to 20% by weight or, in some cases, up to 10% by weight, based on the total weight of the polyol component; and/or the catalyst comprises a modified amine catalyst, such as where the modified amine catalyst is included in an amount of from 0.5 to 8% by weight, such as 1 to 5% by weight, or, in some cases, 2 to 4% by weight, based on total weight of the polyol component, such as where the modified amine catalyst comprises the reaction product of (1) an amine, such as an amine having at least two amino groups, with at least one of those amino groups being a tertiary amino group with (2) an oil, such as a bio-based oil or a derivative thereof having a molecular weight of 500 to 800, such as a reaction product of (1) amines such as those represented by the formula $R_2$—N—$R'_x$—$NH_2$ where R and R' each represents a hydrocarbon and x represents an integer, such as N,N-dimethyl-propylene diamine with (2) an oil, such as castor oil or any fatty acid, such as tall oil, such as the reaction product of N,N-dimethyl-propylene diamine with tall oil.

Certain embodiments of the present invention are directed to a method of any of the previous seven paragraphs, wherein the polyol component is mixed with the polyisocyanate component in a ratio by weight of polyol to isocyanate of from 100:150 to 100:200 and/or the polyol component and the polyisocyanate component are mixed in a ratio such that the NCO/OH index is 75 to 130, such as 85 to 125 or, in some cases, 100 to 120.

In certain embodiments, the present invention is directed to a method of any of the previous eight paragraphs, wherein the polyurethane-foam forming composition is allowed to form an open-celled polyurethane foam in the container, such as where the foamable mixture is activated so that the foaming reaction begins in 30 to 60 seconds, as measured from the emergence of the first amount of the foam-forming composition from a mixing head; after 150 to 200 seconds, as measured from the emergence of the first amount of the foam-forming composition from the mixing head, the foam gels; and/or after 3 to 5 minutes, as measured from the emergence of the first amount of the foam-forming composition from the mixing head, the degas process occurs.

Some embodiments of the present invention are directed to a method of any of the previous nine paragraphs, wherein the heating of the gas-permeable base is accomplished by a heating device, such as a heating pad, matt or plate disposed beneath the gas-permeable base, such as a heating pad, matt or plate that is dimensioned to have a length at least as long as the length of the base of the container and a width at least as wide as the width of the base of the container.

In some embodiments, the present invention is directed to a method of any of the previous ten paragraphs, wherein the base is heated to a temperature of at least 25° C., such as at least 30° C., at least 35° C. or at least 40° C. and, in some cases, up to 120° C., such as up to 90° C., such as up to 70° C., up to 65° C. or up to 60° C.; and/or the base is heated to a temperature of at least 10° C., such as at least 15° C. or, in some cases, at least 20° C. higher and, in some cases, no more than 50° C., such as up to 30° C., higher than the temperature of the ambient air in which the container is disposed; and/or the base is heated to a temperature of at least 10° C., such as at least 15° C. or, in some cases, at least 20° C. higher and, in some cases, no more than 50° C., such as up to 30° C., higher than the temperature of the other portions of the container, including the side walls of the container and/or the cover or lid (if any).

In certain embodiments, the present invention is directed to a discontinuous method of any of the previous eleven paragraphs, wherein the heating is continued during the entirety of step (b) of the method, such as where heating is continued, and the temperature of the base is maintained within one or more of the ranges recited in the immediately preceding paragraph, during the entire period from the beginning of the emergence of the first amount of the foam-forming composition from a mixing head through the degas process.

Some embodiments of the present invention are directed to a method of any of the previous twelve paragraphs, wherein the method produces a foam bun having a higher foam density at one side thereof (the side proximate to the base of the container), such where the higher density portion extends for a length of up to 10% of the total height of the bun, than the density of the remaining portion of the bun.

As will also be appreciated by the foregoing, some embodiments of the present invention are directed to systems for preparing open-celled polyurethane foams by any of the methods described herein that comprise: (a) a source of a polyurethane foam-forming composition, such as any of the polyurethane-foam forming composition described in any one of the previous thirteen paragraphs; (b) a container having a gas-permeable base, such as any container described in any of the previous thirteen paragraphs; and (c) a heating device for the gas-permeable base of the container, such as any heating device described in any of the previous thirteen paragraphs.

The present invention is also directed to, among other things, open-celled polyurethane foams produced by any method and/or using any system described in any of the previous fourteen paragraphs.

The non-limiting and non-exhaustive examples that follow are intended to further describe various non-limiting and non-exhaustive embodiments without restricting the scope of the embodiments described in this specification.

EXAMPLES

The materials used in the Examples were as follows:

POLYOL A: A glycerin-initiated polyether polyol having a functionality of 3 and a molecular weight of approximately 6000.

POLYOL B: A propylene glycol initiated polyether polyol having a functionality of 2 and a molecular weight of 218.

POLYOL C: A glycerin-initiated polyether polyol having a functionality of 3 and a molecular weight of 358.

CATALYST: A modified amine catalyst of the type described in U.S. Patent Application Publication No. 2008/0227879 A1.

SURF: A silicone cell-opening surfactant

CROSS: A crosslinking agent $H_2O$: Water, the blowing agent.

DR2205: Colormatch® DR2205 black pigment from Chromoflo Technologies.

ISO: A mixture of diphenyl methane diisocyanate and a polyphenyl polymethylene polyisocyanate in which from 10 to 50% by weight of the total polyisocyanate is a diphenyl methane diisocyanate and from 50 to 90% of the total polyisocyanate is a polyphenyl polymethylene polyisocyanate.

Example 1

The materials listed in Table 1 were combined in the amounts indicated. The polyols and additives were combined to form the polyol component before being combined with the polyisocyanate component in a suitable container. Both the polyol component and the polyisocyanate components were adjusted to a temperature of 24.5° C. to 25.5° C. The polyol component was charged to the container first, and then the polyisocyanate component was added. The resulting foam-forming composition was mixed with a high speed mixer at 2700 to 2900 rpm. The timer was started at the beginning of the mixing.

TABLE 1

| Ingredient | Amount (parts by weight) |
| --- | --- |
| POLYOL A | 39 |
| POLYOL B | 27.75 |
| POLYOL C | 18 |
| CROSS | 7.6 |
| CATALYST | 2.75 |
| $H_2O$ | 4.1 |
| SURF | 0.5 |
| DR2205 | 0.5 |
| ISO | 165 |
| NCO/OH Index | 113 |

Examples 2-4

After about 20 seconds of mixing, approximately 800 grams of the foam-forming composition was poured into a 13.5"×13.5"×6.5" wooden box 10 of the type depicted in FIG. 1 that had a cardboard base 40. For examples 3 and 4, the box 10 was disposed on a heating plate 20, as shown in FIG. 1, whereas for Example 2 the box 10 was disposed on a wood surface. For example 3, no heat was applied to the base 40 of the cardboard box 10, whereas, for example 4, heat was applied by the heating plate 20 so that the temperature of the base 40 of the cardboard box 10 was 50° C. Temperature probes 30 were placed on the heating plate 20, inside the box 10 on top of the cardboard base 40, and on a side wall of the box 10, as illustrated in FIG. 1. The reactivity of the polyurethane foaming forming composition, the resulting foam density, and the appearance of the bun bottom of the bun were evaluated. Results are set forth in Table 2.

TABLE 2

| Example | Cream Time[1] (seconds) | Gel Time[2] (seconds) | Degas time[3] (seconds) | Bun Foam density (kg/m³) | Bun bottom appearance.[4] |
|---|---|---|---|---|---|
| 2 | 44 | 178 | 202 | 34.43 | Big voids throughout; the bottom 1.5"-2" of the bun were unusable |
| 3 | Not measured | 177 | 200 | 35.28 | Big voids throughout; the bottom 1.5"-2" of the bun were unusable |
| 4 | Not measured | 174 | 192 | 34.75 | No or only small voids at the bottom of the bun; only 0.25" of the bun was unusable |

[1]The period of time from the beginning of mixing of the polyol component with the polyisocyanate until the mixture started to overflow from the mixing container.
[2]A wooden stick was inserted into the bun periodically (3" deep in left corner of bun). Gel time was recorded as the time it took from the beginning of mixing of the polyol component with the polyisocyanate component until the foam depressed with stick pressure.
[3]The period of time from the beginning of mixing of the polyol component with the polyisocyanate component until the start of first popping bubbles in the foam This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant(s) reserve the right to amend the claims during prosecution to add features as variously described in this specification, and such amendments comply with the requirements of 35 U.S.C. § 112, first paragraph, and 35 U.S.C. § 132(a).

What is claimed is:

1. A method for preparing an open-celled polyurethane foam, comprising:
  (a) depositing a polyurethane foam-forming composition comprising a polyisocyanate component and a polyol component into a container having a gas-permeable base, wherein the polyol component comprises:
    (i) 20 to 40% by weight, based on the total weight of the polyol component, of a polypropylene oxide-based polyether diol having an OH number in the range of from 450 to 600;
    (ii) 30 to 50% by weight, based on the total weight of the polyol component, of a poly(propylene/ethylene oxide) glycerin-initiated polyether triol having an OH number in the range of from 26 to 34; and
    (iii) 10 to 30% by weight, based on the total weight of the polyol component, of a polypropylene oxide-based polyether triol having an OH number in the range of from 400 to 550; and
  (b) allowing the polyurethane-foam forming composition to form an open-celled polyurethane foam in the container,
  wherein the method comprises heating the gas-permeable base, with a heating device comprising a heating pad, matt or plate disposed beneath the gas-permeable base, before, during, and/or after step (a) and continuing the heating during at least a portion of step (b), and
  wherein the method is discontinuous.

2. The method of claim 1, wherein the container is a box formed by a base and at least 4 side walls, and, optionally a cover or lid.

3. The method of claim 1, wherein the gas-permeable base is constructed of cardboard and/or paper.

4. The method of claim 1, wherein the polyisocyanate component comprises a mixture of a diphenyl methane diisocyanate and a polyphenyl polymethylene polyisocyanate in which from 10 to 50% h weight of the total polyisocyanate is a diphenyl methane diisocyanate and from 50 to 90% of the total polyisocyanate is a polyphenyl polymethylene polyisocyanate, is used.

5. The method of claim 1, wherein the base is heated to a temperature of at least 30° C. and up to 120° C.

6. The method of claim 5, wherein the base is heated to a temperature of at least 35° C. and up to 70° C.

7. The method of claim 1, wherein the base is heated to a temperature of at least 10° C. higher than the temperature of the ambient air in which the container is disposed.

8. The method of claim 2, wherein the base is heated to a temperature of at least 10° C. higher than the temperature of the side walls of the container.

9. The method of claim 5, wherein (b) comprises continuing the heating and maintaining the temperature of the base at a temperature of at least 30° C. and up to 120° C. during the entire period from the beginning, of the emergence of a first amount of the foam-forming composition from a mixing head through a degas process.

10. The method of claim 8, wherein the base is heated to a temperature at least 20° C. higher than the temperature of the side walls of the container.

11. A method for preparing an open-celled polyurethane foam, comprising:
  (a) depositing a polyurethane foam-forming composition comprising a polyisocyanate component and a polyol component into a container having a gas-permeable base, wherein the polyol component comprises:
    (i) 20 to 40% by weight, based on the total weight of the polyol component, of a polypropylene oxide-based polyether diol having an OH number in the range of from 450 to 600;
    (ii) 30 to 50% by weight, based on the total weight of the polyol component, of a poly(propylene/ethylene oxide) glycerin-initiated polyether triol having an OH number in the range of from 26 to 34; and
    (iii) 10 to 30% by weight, based on the total weight of the polyol component, of a polypropylene oxide-based polyether triol having an OH number in the range of from 400 to 550; and
  (b) allowing the polyurethane-foam forming composition to form an open-celled polyurethane foam in the container,
  wherein only the gas-permeable base and optionally a bottom portion of the side walls of the container are heated before, during, and/or after step (a) and continuing the heating during at least a portion of step (b), and
  wherein the method is discontinuous.

12. The method of claim 11, wherein up to 10% of the length of the side walls, proximate to the base, are heated.

13. The method of claim 11, wherein the polyisocyanate component comprises a mixture of a diphenyl methane diisocyanate and a polyphenyl polymethylene polyisocyanate in which from 10 to 50% by weight of the total polyisocyanate is a diphenyl methane diisocyanate and from 50 to 90% of the total poiviaocyanate is a polyphenyl polymethylene polyisocyanate, is used.

14. The method of claim 11, wherein only the base and optionally a bottom portion of the side walls of the container are heated to a temperature of at least 30° C. and up to 120° C.

15. The method of claim 14, wherein the base is heated to a temperature of at least 35° C. and up to 70° C.

16. The method of claim 11, wherein the base is heated to a temperature of at least 10° C. higher than the temperature of the ambient air in which the container is disposed.

17. The method of claim 11, wherein up to 10% of the length of the side walls, proximate to the base, are heated.

18. The method of claim 11, wherein the gas-permeable base is heated with a heating device comprising a heating pad, malt or plate disposed beneath the gas-permeable base.

* * * * *